United States Patent
Joo et al.

(10) Patent No.: US 7,776,779 B2
(45) Date of Patent: Aug. 17, 2010

(54) MESOPOROUS CARBON, MANUFACTURING METHOD THEREOF, AND FUEL CELL USING THE MESOPOROUS CARBON

(75) Inventors: Sang Hoon Joo, Yongin-si (KR); Chan-ho Pak, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 615 days.

(21) Appl. No.: 11/445,235

(22) Filed: Jun. 2, 2006

(65) Prior Publication Data
US 2007/0116625 A1  May 24, 2007

(30) Foreign Application Priority Data
Nov. 21, 2005  (KR) .................. 10-2005-0111429

(51) Int. Cl.
| | |
|---|---|
| C01B 31/00 | (2006.01) |
| C01B 31/02 | (2006.01) |
| C01B 31/08 | (2006.01) |
| B01J 21/18 | (2006.01) |
| B01J 23/40 | (2006.01) |
| B01J 23/74 | (2006.01) |

(52) U.S. Cl. .............. 502/180; 502/185; 502/416; 502/418; 423/445 R; 423/461

(58) Field of Classification Search ............. None
See application file for complete search history.

(56) References Cited

U.S. PATENT DOCUMENTS
| | | | | |
|---|---|---|---|---|
| 6,585,948 | B1 * | 7/2003 | Ryoo et al. ............. | 423/445 R |
| 6,812,187 | B1 * | 11/2004 | Pak et al. .................. | 502/180 |
| 2006/0093915 | A1 * | 5/2006 | Lundquist et al. ........ | 429/231.8 |
| 2007/0122334 | A1 | 5/2007 | Pak et al. | |

FOREIGN PATENT DOCUMENTS
| | | |
|---|---|---|
| CN | 1544321 A | 11/2004 |
| JP | 2005-154268 | 6/2005 |

(Continued)

OTHER PUBLICATIONS

Yudin et al.; Carbon/Carbon Composite Based on a Polyimide Matrix with Coal Tar Pitch; Carbon; 40, pp. 1427-1433; 2002.*

(Continued)

*Primary Examiner*—Melvin C Mayes
*Assistant Examiner*—Guinever S Gregorio
(74) *Attorney, Agent, or Firm*—Stein McEwen, LLP

(57) ABSTRACT

A method of preparing a mesoporous carbon includes mixing a mesophase pitch, a carbon precursor, an acid, and a solvent to obtain a carbon precursor mixture; impregnating an ordered mesoporous silica (OMS) with the carbon precursor mixture; heat-treating and carbonizing the impregnated OMS to form an OMS-carbon composite; and removing the OMS from the OMS-carbon composite. The mesoporous carbon uses the mesophase pitch and the carbon precursor to reduce sheet resistance, and thus can efficiently transfer electric energy. Such mesoporous carbon can be used as a conductive material of electrodes for fuel cells. When the mesoporous carbon is used as a support for catalysts of electrodes, a supported catalyst containing the support can be used to manufacture a fuel cell having high efficiency.

24 Claims, 8 Drawing Sheets

FOREIGN PATENT DOCUMENTS

| | | |
|---|---|---|
| KR | 2001-1127 A | 1/2001 |
| WO | WO 03/006372 | 1/2003 |
| WO | WO 2004/092052 | 10/2004 |

OTHER PUBLICATIONS

Ryoo et al.; Synthesis of Highly Ordered Carbon Molecular Sieves via Template-Mediated Structural Transformation; The Journal of Physical Chemistry B; vol. 103, No. 37, pp. 7743-7746; 1999.*

Of Yang et al.; A Simple Melt Impregnation Method to Synthesize Ordered Mesoporous Carbon and Carbon Nanofiber Bundles with Graphitized Structure from Pitches; J. Phys. Chem. B; 108, 17320-17328; 2004.*

Office Action issued by Chinese Patent Office in Chinese Patent Application No. 2006100998460 on Jan. 16, 2009.

Ryoo, Ryong, et al. *Synthesis of Highly Ordered Carbon Molecular Sieves via Template-Mediated Structural Transformation*. American Chemical Society, vol. 103, No. 37, Sep. 16, 1999.

Joo, Sang Hoon, et al. *Ordered nanoporous arrays of carbon supporting high dispersions of platinum nanoparticles*. Nature. vol. 412, Jul. 12, 2000.

K.P. Gierszal et al., "Adsorption and Structural Properties of Ordered Mesoporous Carbons Synthesized by Using Various Carbon Precursors and Ordered Siliceous *P6mm* and *Ia3d* Mesostructures as Templates," J. Phys. Chem B, Nov. 18, 2005, vol. 109, pp. 23263-23268.

Japanese Office Action issued Feb. 9, 2010, in corresponding Japanese Patent Application No. 2006-153954.

* cited by examiner

MESOPOROUS CARBON, MANUFACTURING METHOD THEREOF, AND FUEL CELL USING THE MESOPOROUS CARBON

CROSS-REFERENCE TO RELATED PATENT APPLICATIONS

This application claims the benefit of Korean Application No. 2005-111429, filed Nov. 21, 2005, in the Korean Intellectual Property Office, the disclosure of which is incorporated herein by reference.

BACKGROUND OF THE INVENTION

1. Field of the Invention

Aspects of the present invention relate to mesoporous carbon, a method of manufacturing the same and a fuel cell using the mesoporous carbon, and more particularly, to a method of manufacturing mesoporous carbon with high conductivity using an easily graphitized mesophase pitch and other carbon precursors, mesoporous carbon having low sheet resistance and mesopores prepared using the method, and a fuel cell using the mesoporous carbon as a support for catalysts.

2. Description of the Related Art

Catalysts that are contained in electrodes of fuel cells to facilitate electrochemical reactions play an important role, and thus, it is desirable that the activity of catalysts used in electrodes be as high as possible. Since the activity of a catalyst increases as the reaction surface area of the catalyst increases, catalyst particles should be reduced in diameter to increase the reaction surface area and should be uniformly distributed in an electrode. A catalyst support should have a large surface area, and thus much research into catalyst supports has been carried out.

Meanwhile, in addition to a large surface area, which may be obtained through high porosity, a support for a fuel cell catalyst should have sufficient electrical conductivity to act as a path for the flow of electrons. A conventional example of such a support is an amorphous microporous carbon powder, such as activated carbon or carbon black, and a regularly arranged carbon molecular sieve material (Korean Patent Laid-Open Gazette No. 2001-0001127).

However, it is known that micropores of such an amorphous microporous carbon powder are poorly connected. Therefore, in a conventional direct methanol fuel cell (DMFC), a supported catalyst that is prepared using an amorphous microporous carbon powder as a support exhibits much lower reactivity than do metal particles used by themselves as a catalyst.

However, when metal particles are used by themselves as a catalyst, the amount of the catalyst required is greater, and thus, the manufacturing costs of a DMFC increase. Accordingly, the development of a supported catalyst that can improve catalyst activity is urgently desired.

SUMMARY OF THE INVENTION

Aspects of the present invention provide a method of preparing mesoporous carbon having low sheet resistance, and the mesoporous carbon prepared using the method.

Aspects of the present invention also provide a supported catalyst containing the mesoporous carbon and a fuel cell having improved efficiency by using the supported catalyst.

According to an aspect of the present invention, there is provided a method of preparing mesoporous carbon including: mixing a mesophase pitch, a carbon precursor, an acid, and a solvent to obtain a carbon precursor mixture; impregnating an ordered mesoporous silica (OMS) with the carbon precursor mixture; heat-treating and carbonizing the impregnated OMS to form an OMS-carbon composite; and removing the OMS from the OMS-carbon composite.

According to an aspect of the present invention, the weight ratio of the mesophase pitch to the carbon precursor in the carbon precursor mixture may be in the range of 1:4 to 1:1. The carbon precursor is composed of at least one material of carbohydrates, furfuryl alcohol, divinylbenzene, phenol-formaldehyde, resorcinol-formaldehyde, phenanthrene, and anthracene.

According to an aspect of the present invention, the total amount of the mesophase pitch and the carbon precursor is in the range of 50 to 120 parts by weight based on 100 parts by weight of the OMS. The acid is composed of at least one acid of sulfuric acid, nitric acid, phosphoric acid, and para-toluene sulfonic acid.

According to an aspect of the present invention, the solvent is composed of at least one solvent of water, acetone, methanol, ethanol, isopropylalcohol, n-propylalcohol, butanol, dimethylacetamide, dimethylformamide, dimethylsulfoxide, N-methyl-2-pyrrolidone, tetrahydrofurane, tetrabutylacetate, n-butylacetate, m-cresole, toluene, ethyleneglycol, γ-butyrolactone butyrolactone and hexafluoroisopropanol (HFIP).

According to an aspect of the present invention, the amount of the acid is in the range of 30 to 300 parts by weight based on 100 parts by weight of the OMS, and the amount of the solvent in the range of 400 to 900 parts by weight based on 100 parts by weight of the OMS.

According to another aspect of the present invention, there is provided a mesoporous carbon having mesopores prepared using the above-described method.

In the mesoporous carbon, one or more main peaks of Bragg's 2 theta (2θ) angle to the CuK-α X-ray wavelength of 1.541 Å appear at 0.5 to 2°, at 23 to 26°, or at 0.5 to 2 and at 23 to 26°. The average diameter of mesopores is in the range of 2 to 10 nm, the mesoporous carbon has a specific surface area of 200 to 2000 $m^2/g$, and the mesoporous carbon has a sheet resistance of 1 to 50 $m\Omega/cm^2$ at a pressure of 75.4 $kgf/cm^2$.

According to another aspect of the present invention, there is provided a supported catalyst including: the mesoporous carbon; and metal catalyst particles that are supported on the mesoporous carbon.

According to an aspect of the present invention, the amount of the metal catalyst particles is in the range of 40 to 80 parts by weight based on 100 parts by weight of the supported catalyst.

According to another aspect of the present invention, there is provided a fuel cell including a cathode, an anode, and an electrolyte membrane interposed between the cathode and the anode, wherein at least one of the cathode and the anode contains the mesoporous carbon and the supported catalyst having metal catalyst particles supported on the mesoporous carbon.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
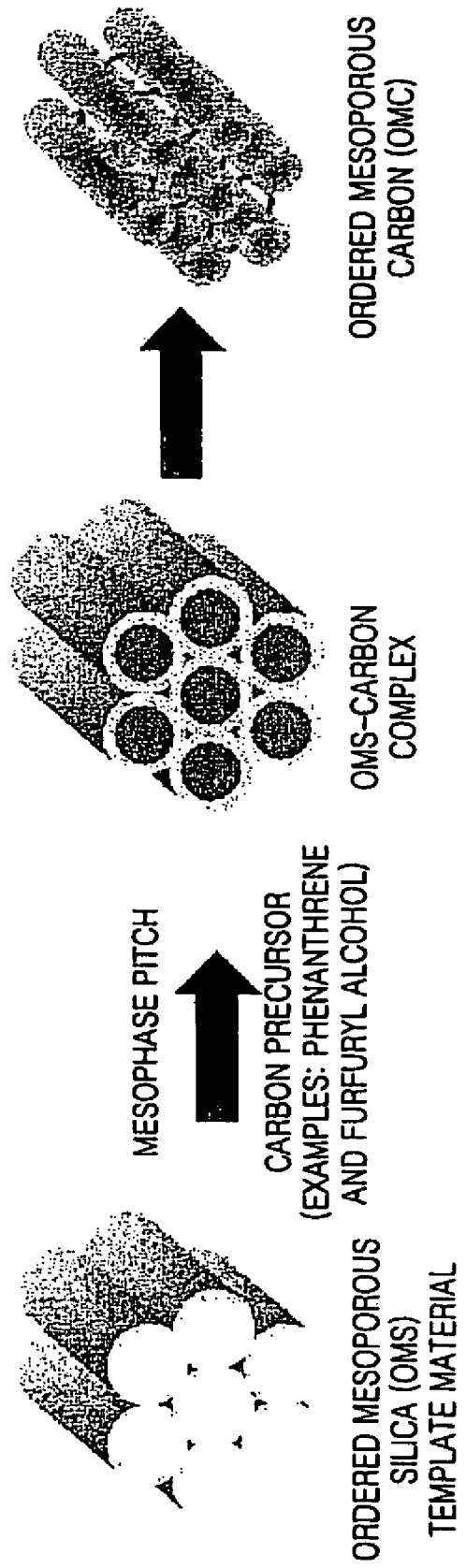
FIG. 1 is a schematic diagram illustrating a method of preparing mesoporous carbon according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

To improve the conductivity of mesoporous carbon, mesophase pitch, which is easily graphitized and is used as a carbon precursor, is mixed with other carbon precursors and used to form the mesoporous carbon.

Herein, the term mesophase pitch indicates a multi-aromatic molecule that is easily graphitized and has a plurality of benzene rings. Mesophase pitch does not dissolve in water, but dissolves in aromatic solvents such as benzene or toluene. The term graphitize indicates a process of forming carbon having a similar structure to graphite through heat-treatment.

The mesophase pitch according to an embodiment of the present invention may have any shape, such as, for example, a fiber shape, a thin film shape, a spherical shape or an almost spherical shape.

A structural formula of the mesophase pitch can vary according to the type of precursor used. For example, AR pitch prepared from naphthalene by Mitsubishi may be represented by the following formula:

FIG. 1 is a schematic diagram illustrating a method of preparing mesoporous carbon according to an embodiment of the present invention.

Referring to FIG. 1, a prescribed amount of the mesophase pitch and a carbon precursor are introduced into an ordered mesoporous silica (OMS) template to form an OMS-carbon composite. Herein, the OMS has an X-ray diffraction peak of 2° or less because of regularly arranged pores.

Next, OMS is removed from the OMS-carbon composite to obtain ordered mesoporous carbon.

Figure 2:
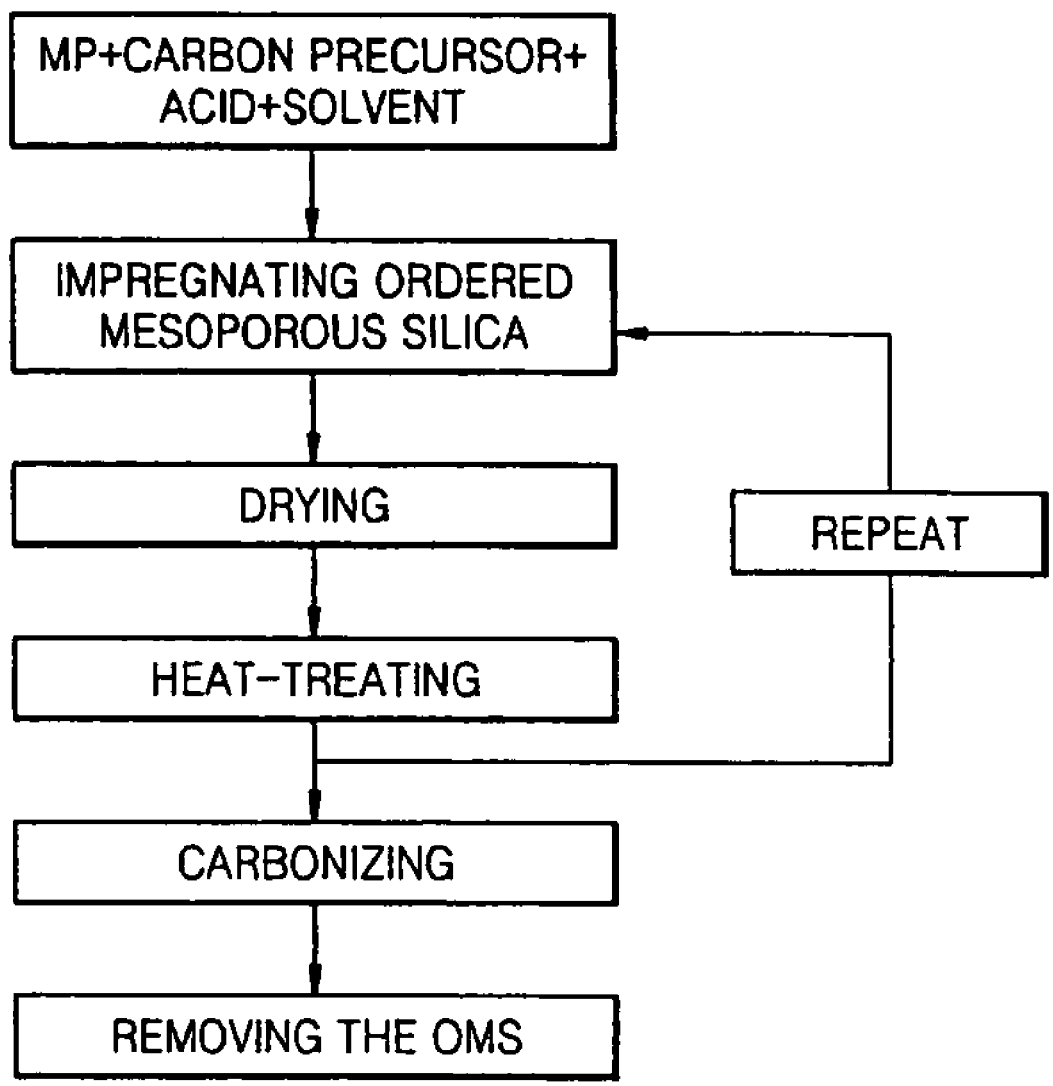
FIG. 2 is a flow chart illustrating a method of preparing mesoporous carbon according to an embodiment of the present invention.

A method of preparing mesoporous carbon according to an embodiment of the present invention will now be described in detail with reference to FIG. 2.

A mesophase pitch, a carbon precursor, an acid, and a solvent are mixed to obtain a carbon precursor mixture.

Non-limiting examples of the carbon precursor include carbohydrates such as sucrose, furfuryl alcohol, divinylbenzene, phenol-formaldehyde, resorcinol-formaldehyde, aromatic compounds such as phenanthrene and anthracene. The acid that is used to prepare the precursor mixture may be an organic acid or an inorganic acid. Non-limiting examples of the acid include sulfuric acid, nitric acid, phosphoric acid, and para-toluene sulfonic acid.

In the carbon precursor mixture, the weight ratio of the mesophase pitch to the carbon precursor may be in the range of 1:4 to 1:1. When the weight ratio of the mesophase pitch to the carbon precursor is below the above range, the sheet resistance is not decreased sufficiently.

On the other hand, when the weight ratio of the mesophase pitch to the carbon precursor is greater than the above range, catalyst particles are not easily supported in a highly dispersed state since the BET surface area of the mesoporous carbon is too small.

The entire amount of the mesophase pitch and the carbon precursor is in the range of 50 to 120 parts by weight based on 100 parts by weight of the OMS. When the entire amount of the mesophase pitch and the carbon precursor is less than 50 parts by weight based on 100 parts by weight of the OMS, it is difficult to form the mesoporous carbon. When the amount of the mesophase pitch and the carbon precursor is greater than 120 parts by weight based on 100 parts by weight of the OMS, the carbon precursor outside the silica particles is also polymerized and is likely to agglomerate, which is not desirable.

The solvent that is used to prepare the precursor mixture may be any solvent that can uniformly disperse the carbon precursor. More particularly, as non-limiting examples, the solvent may be water, acetone, methanol, ethanol, isopropylalcohol, n-propylalcohol, butanol, dimethylacetamide, dim-

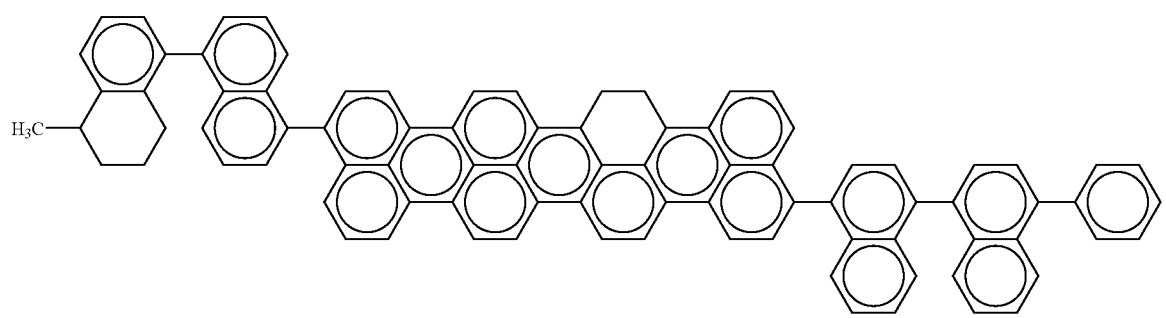

AR, synthesized pitch (1)

ethylformamide, dimethylsulfoxide, N-methyl-2-pyrrolidone, tetrahydrofurane, tetrabutylacetate, n-butylacetate, m-cresole, toluene, ethyleneglycol, γ-butyrolactone, hexafluoroisopropanol (HFIP), or the like. These materials can be used alone or in combination.

In the carbon precursor mixture, the amount of the acid may be in the range of 30 to 300 parts by weight based on 100 parts by weight of the OMS. When the amount of the acid is less than 30 parts by weight, it may be difficult to facilitate the generation of the mesoporous carbon. On the other hand, when the amount of the acid is greater than 300 parts by weight, the formation of a carbon material may be facilitated even outside the OMS, and thus, a degree of order is reduced.

In the carbon precursor mixture, the amount of the solvent may be in the range of 400 to 900 parts by weight based on 100 parts by weight of OMS. When the amount of the solvent is less than 400 parts by weight, the precursor may be insufficiently dissolved in the solvent. When the amount of the solvent is greater than 900 parts by weight, the carbon precursor can be polymerized outside the silica particle, which is not desirable.

Particularly, the weight ratio of the entire amount of the carbon precursor and the mesophase pitch to the acid may be in the range of 1:3.5 to 1:0.3, and more preferably, 1:3.0 to 1:0.5. When the weight ratio is within this range, the carbon precursor harmoniously reacts with the acid such that the mesoporous carbon may be easily produced.

The OMS is impregnated with the carbon precursor mixture prepared above. Then, the impregnated OMS is heat-treated and carbonized to form an OMS-carbon composite.

The OMS may have a molecular sieve material structure such that one-dimensional pores are mutually connected by micropores, but is not limited thereto. More particularly, the OMS may be MCM-48, which has a cubic structure, SBA-1, which has another cubic structure, SBA-15, which has a hexagonal structure, or KIT-1, MSU-1, or the like, which have an irregularly connected three-dimensional structure. Furthermore, the OMS may be any type of a molecular sieve material that contains any type of mesoporous material structured such that one-dimensional pores are mutually connected by micropores.

The impregnating temperature is not particularly limited, but may be room temperature.

If necessary, the precursor mixture that is impregnated may be dried. The drying temperature is not particularly limited, but may be room temperature. In addition, for quick drying, the drying process may be performed under reduced pressure.

The heat treatment may be performed at 50 to 250° C. When the heat treatment temperature is lower than 50° C., the structure of the mesoporous carbon may be improperly formed. When the heat treatment temperature is higher than 250° C., uniformity of the mesoporous carbon to be formed may decrease. Alternatively, the heat treatment may be divided into a first heat treatment and a second heat treatment. For example, the first heat treatment may be performed at about 50° C. to about 150° C., and the second heat treatment may be performed at about 150° C. to about 250° C. Through the heat treatment, a mesoporous carbon structure is formed, and a liquid solvent and the like are completely removed.

The mesoporous carbon may be prepared by impregnating an OMS material, heat-treating the impregnated OMS material and then directly carbonizing the heat-treated impregnated OMS material as described below. However, if the impregnation and heat-treatment is carried out only once, there is a possibility that the carbon structure may be incompletely formed in the OMS pores. Accordingly, before the impregnated OMS material is carbonized, cycles of impregnating and heat treating may be repeatedly performed to ensure a complete formation of a carbon structure in the mesoporous silica pores. However, repetition of the impregnation and the heat treatment more than 10 times may be unnecessary because satisfactory results may be obtained with fewer repetitions.

As described above, the carbon structure that is obtained by impregnating the OMS material with the precursor mixture and heat-treating the impregnated OMS material is carbonized to obtain an ordered mesoporous carbon structure. The carbon precursor that is impregnated into the OMS becomes graphitized through the carbonization, and the mesoporous silica acts as a template to provide the carbonized material with an ordered structure. The carbonization may be achieved by, for example, heating the heat-treated impregnated OMS material to 600° C. to 1400° C. using a heating device such as an electric furnace.

When the carbonizing temperature is lower than 600° C., graphitization may occur incompletely, and thus, the degree of ordering may be low. When the carbonizing temperature is higher than 1500° C., carbon may thermally decompose or the structure of the OMS acting as the template may be deformed.

The carbonization may be performed in a non-oxidizing atmosphere. The non-oxidizing atmosphere may be one of a vacuum atmosphere, a nitrogen atmosphere, and an inert gas atmosphere.

Then, the OMS is removed from the OMS-carbon composite using a solvent capable of selectively dissolving the OMS.

The solvent that can selectively dissolve the OMS may be, for example, an aqueous HF solution or an aqueous NaOH solution. The concentration of the aqueous HF solution may be 5 to 47 wt % and the concentration of the aqueous NaOH solution may be 5 to 30 wt %.

It is well known that the OMS becomes a water-soluble silicate through alkali melting or carbonate dissociation and reacts with HF to form $SiF_4$, which easily erodes. By removing the OMS, the mesoporous carbon can be separated.

The mesoporous carbon obtained according to an embodiment of the present invention may be ordered mesoporous carbon in which pores are regularly arranged.

While a conventional amorphous microporous carbon powder includes micropores only, the mesoporous carbon according to an embodiment of the present invention includes mesopores and micropores in a proper ratio. Herein, according to the International Union of Pure and Applied Chemistry (IUPAC), a micropore is defined as a pore of about 2 nm or less in diameter, and a mesopore is defined as a pore of 2 to 50 nm in diameter.

The average diameter of mesopores of the mesoporous carbon is 2 to 10 nm. The mesoporous carbon has a specific surface area of 200 to 2000 $m^2/g$. Also, the mesoporous carbon has a sheet resistance of 1 to 50 $m\Omega/cm^2$ when measured using a 4-point probe method at a pressure of 75.4±3.0 $kg_f/cm^2$. The sheet resistance of the mesoporous carbon according to an embodiment of the present invention is much lower than that of conventional mesoporous carbon.

When the average diameter of the mesopores is less than 2 nm, diffusion of a supplied fuel may not occur smoothly and the activity of the catalyst may be limited. When the average diameter of the mesopores is greater than 10 nm, the catalyst particles easily increase in size when the catalyst is produced, and thus, the efficiency of the catalyst decreases.

When the specific surface area of the mesoporous carbon is less than 200 $m^2/g$, it may be difficult to provide sufficient dispersion of catalyst particles to be loaded onto the mesoporous carbon. When the specific surface area of the mesoporous carbon is greater than 2000 m²/g, the diffusion of fuel may limited because of too many micropores, and thus, the efficiency of a catalyst may decrease.

Since pores in the mesoporous carbon according to an embodiment of the present invention are regularly arranged, a main peak of Bragg's 2 theta (2θ) angle to the CuK-α X-ray wavelength of 1.541 Å appears at least once at 0.5 to 2° and/or 23 to 26°. The peak between 0.5 and 2° is obtained from a regular arrangement of the mesopores and the peak between 23 to 26° is obtained from a regular arrangement of the graphite layer of the carbon structure.

A supported catalyst that contains the mesoporous carbon acting as a support will now be described in detail.

A supported catalyst according to an embodiment of the present invention includes the mesoporous carbon described above, and metal catalyst particles that are distributed and supported on the mesoporous carbon. The metal catalyst particles are distributed and supported on the surface or pores of the mesoporous carbon.

The metal catalyst that can be used in the supported catalyst is not particularly limited, but, as non-limiting examples, may be Ti, V, Cr, Mn, Fe, Co, Ni, Cu, Zn, Al, Mo, Se, Sn, Pt, Ru, Pd, W, Ir, Os, Rh, Nb, Ta, Pb, Bi, or a combination of these.

A suitable metal catalyst may vary according to a reaction to which the supported catalyst is to be subjected. In addition, the metal catalyst may be a single metal or an alloy of two or more metals.

More particularly, when the supported catalyst according to an embodiment of the present invention is used in a catalyst layer of a cathode or an anode of a fuel cell, such as a phosphoric acid fuel cell (PAFC) or a proton exchange membrane fuel cell (PEMFC), Pt can be used as the metal catalyst. In another embodiment, the supported catalyst may be used in a catalyst layer of an anode of a direct methanol fuel cell (DMFC), in which case, an alloy of Pt and Ru may be used as the metal catalyst. In this case, the atomic ratio of Pt to Ru may be, in general, in the range of about 0.5:1 to about 2:1. In yet another embodiment, the supported catalyst may be used in a catalyst layer of a cathode of a DMFC, in which case, Pt may be used as the metal catalyst.

When the average particle size of the metal catalyst particles is too small, the catalyst reaction may not be facilitated. On the other hand, when the average particle size of the metal catalyst particles is too large, the reaction surface area of the entire catalyst particle is reduced, and thus, the efficiency of the supported catalyst may be reduced. In consideration of these problems, the average particle size of the metal catalyst particle may be in the range of about 1 nm to about 5 nm.

When the amount of the metal catalyst contained in the supported catalyst is too small, the metal catalyst may have little effect when applied to a fuel cell. When the amount of the metal catalyst particle contained in the supported catalyst is too large, the manufacturing costs may increase and the catalyst particle size may increase. In consideration of these problems, the amount of the metal catalyst contained in the supported catalyst may be in the range of 40 to about 80 parts by weight based on 100 parts by weight of the supported catalyst.

The supported catalyst according to an embodiment of the present invention can be formed using various known methods of producing a supported catalyst. For example, the supported catalyst according to an embodiment of the present invention may be formed by impregnating a support with a metal catalyst precursor solution and reducing the impregnated metal catalyst precursor. The method of producing a supported catalyst is described in various references in detail, and thus will not be described herein in detail.

A fuel cell according to an embodiment of the present invention will now be described in detail.

The fuel cell includes a cathode, an anode, and an electrolyte membrane interposed therebetween. Here, at least one of the cathode and the anode includes the supported catalyst described above.

The fuel cell according to an embodiment of the present invention may be realized as, for example, a PAFC, a PEMFC, or a DMFC. The structures of these fuel cells and methods of manufacturing them are not particularly limited, and are described in detail in various references. Accordingly, the structure and manufacturing method of the fuel cell will not be described herein in detail.

Aspects of the present invention will be described in further detail with reference to the following examples. These examples are for illustrative purposes only and are hot intended to limit the scope of the present invention.

EXAMPLE 1

Preparation of Mesoporous Carbon 0.53 g of phenanthrene, 0.17 g of mesophase pitch (MP) and 0.4 g of sulfuric acid were completely dissolved in 6 mL of acetone to prepare a homogeneous carbon precursor mixture. As can be seen, the weight ratio of the phenanthrene to the mesophase pitch was about 3:1.

The carbon precursor mixture was divided into three equal parts by weight, and 1 g of SBA-15, an OMS material, was impregnated with one third of the carbon precursor mixture. The impregnated SBA-15 was dried in a hood at room temperature for 60 minutes, and then heat-treated at 100° C.

The dried result was impregnated with another one third of the carbon precursor mixture, and the result was dried as described above.

Subsequently, the dried result was impregnated with the remaining one third of the carbon precursor mixture, and the result was dried as described above.

The dried result was cooled to room temperature, heated under a nitrogen atmosphere and carbonized at 1100° C.

The carbonized result was stirred with a mixed solution containing HF, water, and ethanol to remove the SBA-15, thereby obtaining mesoporous carbon.

EXAMPLE 2

Mesoporous carbon was prepared in the same manner as in Example 1, except that furfuryl alcohol was used instead of phenanthrene to prepare of the carbon precursor mixture.

EXAMPLE 3

Mesoporous carbon was prepared in the same manner as in Example 1, except that the weight ratio of phenanthrene to MP was 1:1.

EXAMPLE 4

Mesoporous carbon was prepared in the same manner as Example 1, except that the weight ratio of phenanthrene to MP was 1:3.

COMPARATIVE EXAMPLE 1

Mesoporous carbon was prepared in the same manner as Example 1, except that the carbon precursor mixture contained only sucrose as the carbon precursor and did not contain MP.

COMPARATIVE EXAMPLE 2

Mesoporous carbon was prepared in the same manner as Example 1, except that the carbon precursor mixture contained only MP as a carbon precursor and did not contain another carbon precursor.

Figure 3A:
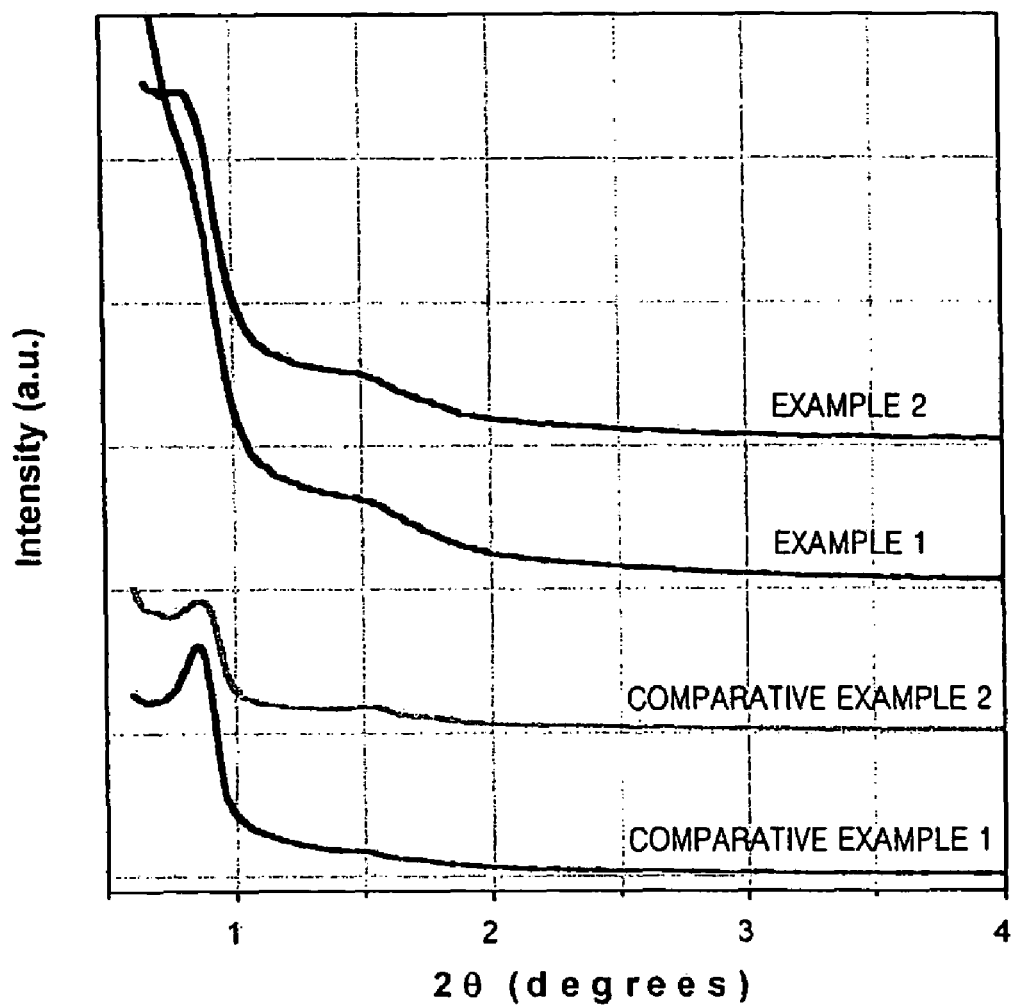
FIGS. 3A and 3B are graphs illustrating the results of X-ray diffraction analysis on mesoporous carbon prepared in Examples 1 and 2 and Comparative Examples 1 and 2.
Figure 3B:
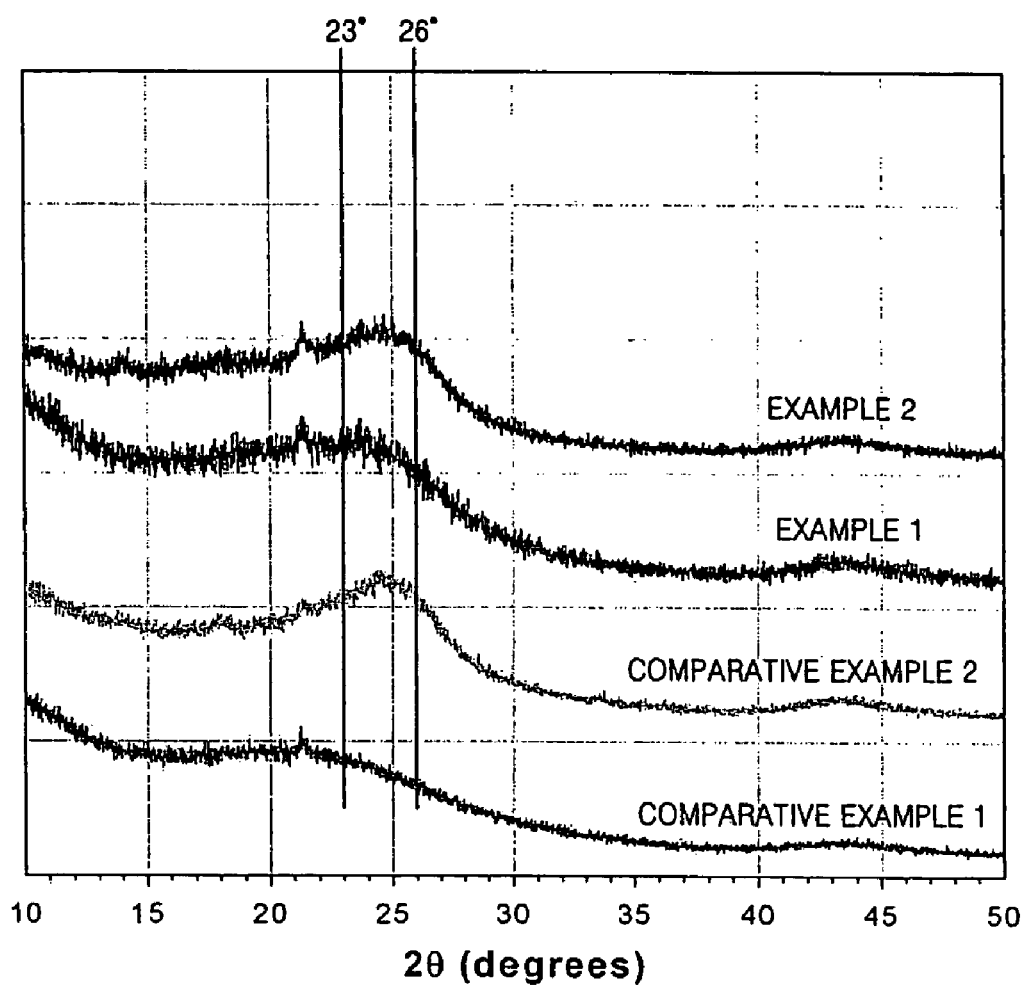

X-ray diffraction analysis was performed on the mesoporous carbon prepared according to Examples 1 and 2 and Comparative Examples 1 and 2, and the results are illustrated in FIGS. 3A and 3B.

Referring to FIGS. 3A and 3B, all the X-ray peaks of the mesoporous carbon prepared in Examples 1 and 2 and Comparative Examples 1 and 2 appeared at 0.5 to 2°, showing regularity in the mesopores.

Figure 4:
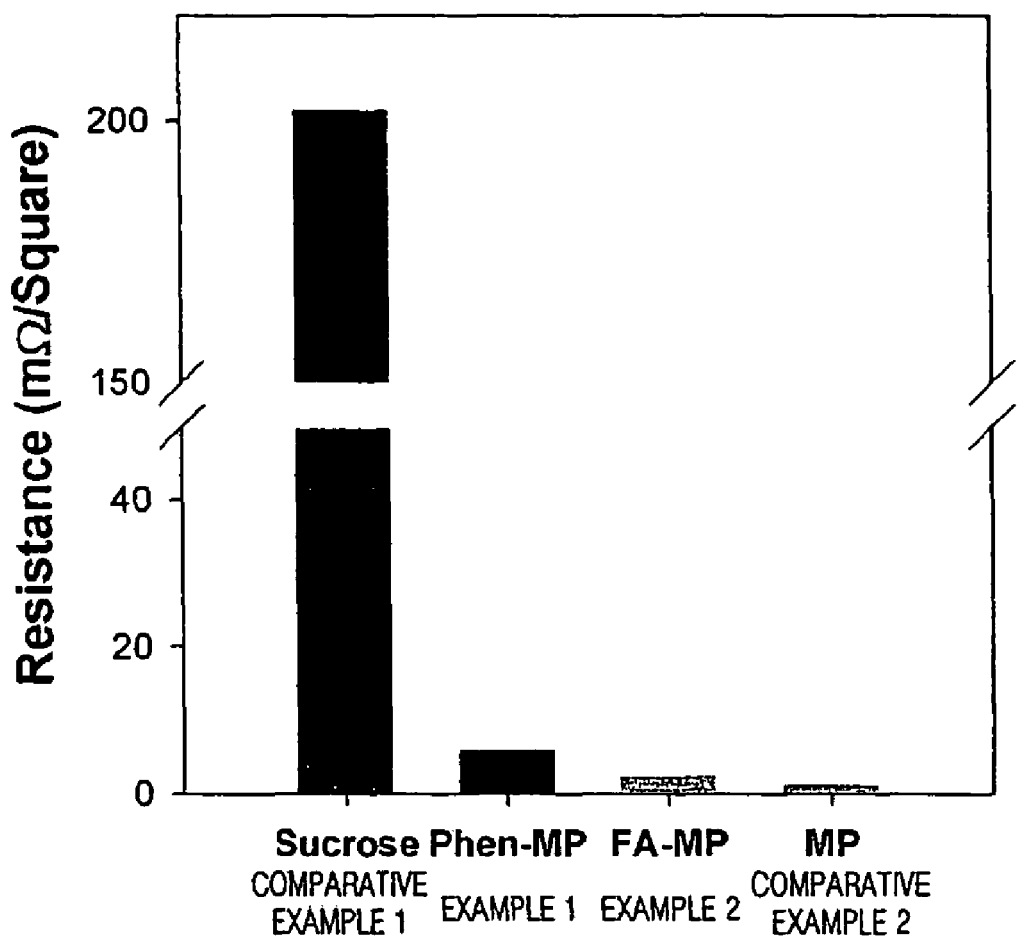
FIG. 4 is a graph illustrating the results of measuring the sheet resistance of the mesoporous carbon prepared in Examples 1 and 2 and Comparative Examples 1 and 2.

FIG. 4 illustrates the results of measuring the sheet resistance of the mesoporous carbon prepared in Examples 1 and 2 and Comparative Examples 1 and 2. The sheet resistance was measured as follows.

The sheet resistance was measured using a 4-point probe method. 50 mg of the mesoporous carbon of Examples 1 and 2 and Comparative Examples 1 and 2 was placed in a sheet resistance measurement system (CMT series, Changmintech) and the sheet resistance was measured while applying pressures of 75.4 kg/cm$^2$ and 150.8 kg/cm$^2$ to the mesoporous carbon. The sheet resistance measurement system included 4 electrodes, i.e., a pair of electrodes for measuring a voltage and a pair of electrodes for measuring a current, at a bottom of a chamber containing the material to be measured.

Referring to FIG. 4, the mesoporous carbon of Examples 1 and 2 had a much lower sheet resistance than the mesoporous carbon of Comparative Example 1.

The mesoporous carbon prepared in Comparative Example 1 in which sucrose was used as the carbon precursor had much higher sheet resistance than the mesoporous carbon prepared using MP.

Figure 5:
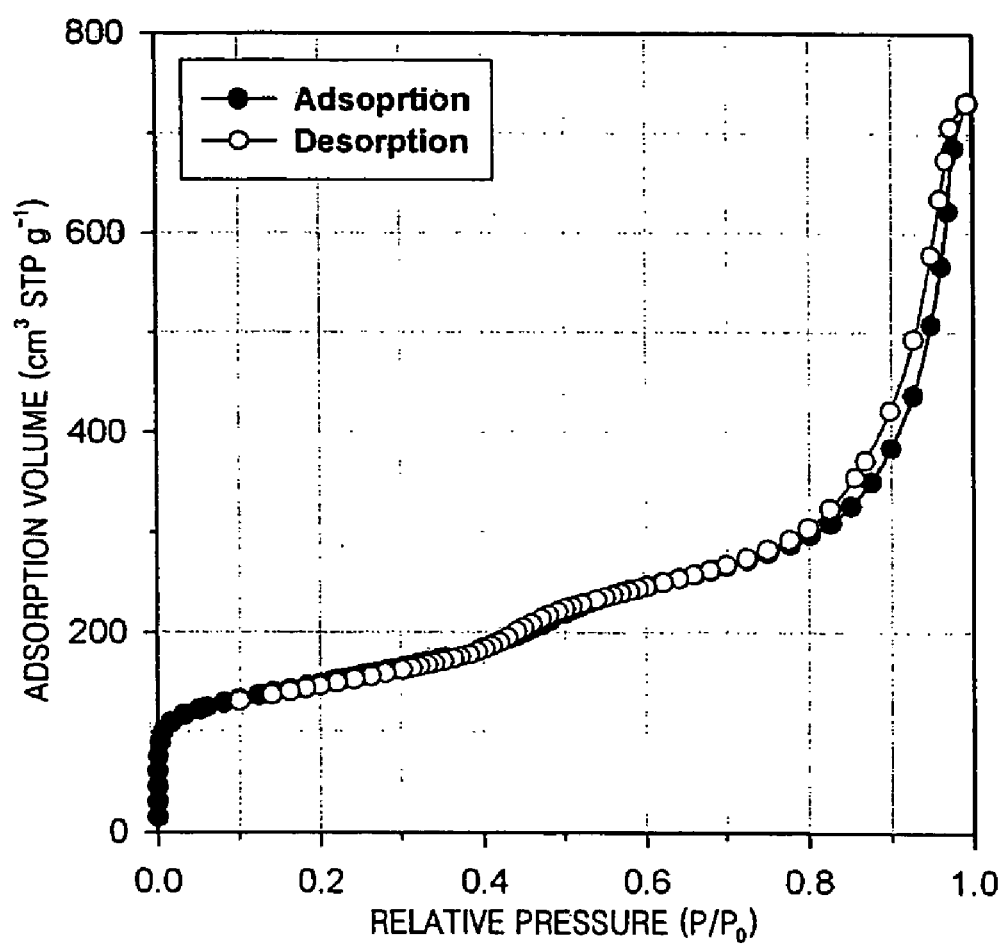
FIG. 5 is a nitrogen adsorption-desorption curve of the mesoporous carbon prepared in Example 1.
Figure 6:
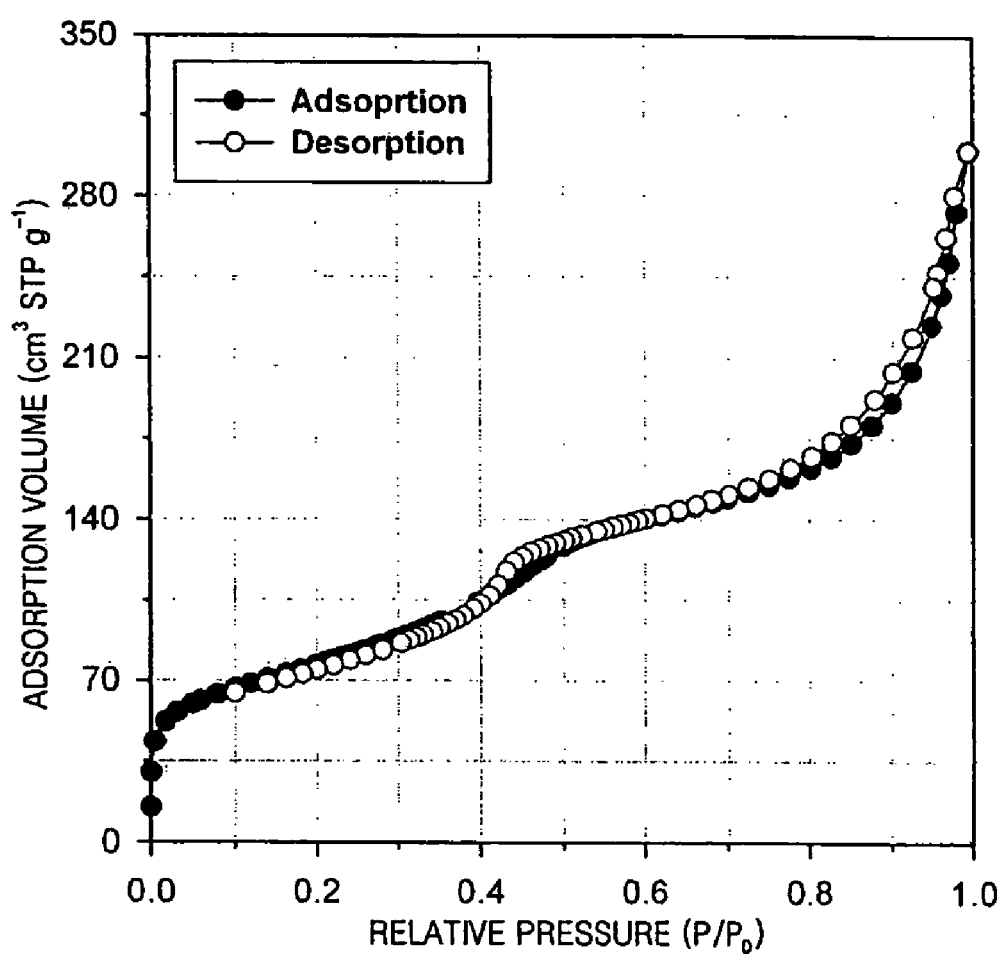
FIG. 6 is a nitrogen adsorption-desorption curve of the mesoporous carbon prepared in Example 2.

FIGS. 5 and 6 are nitrogen adsorption-desorption curves of the mesoporous carbon prepared in Examples 1 and 2, respectively, which results correlate with the BET surface area of the mesoporous carbon.

Figure 7:
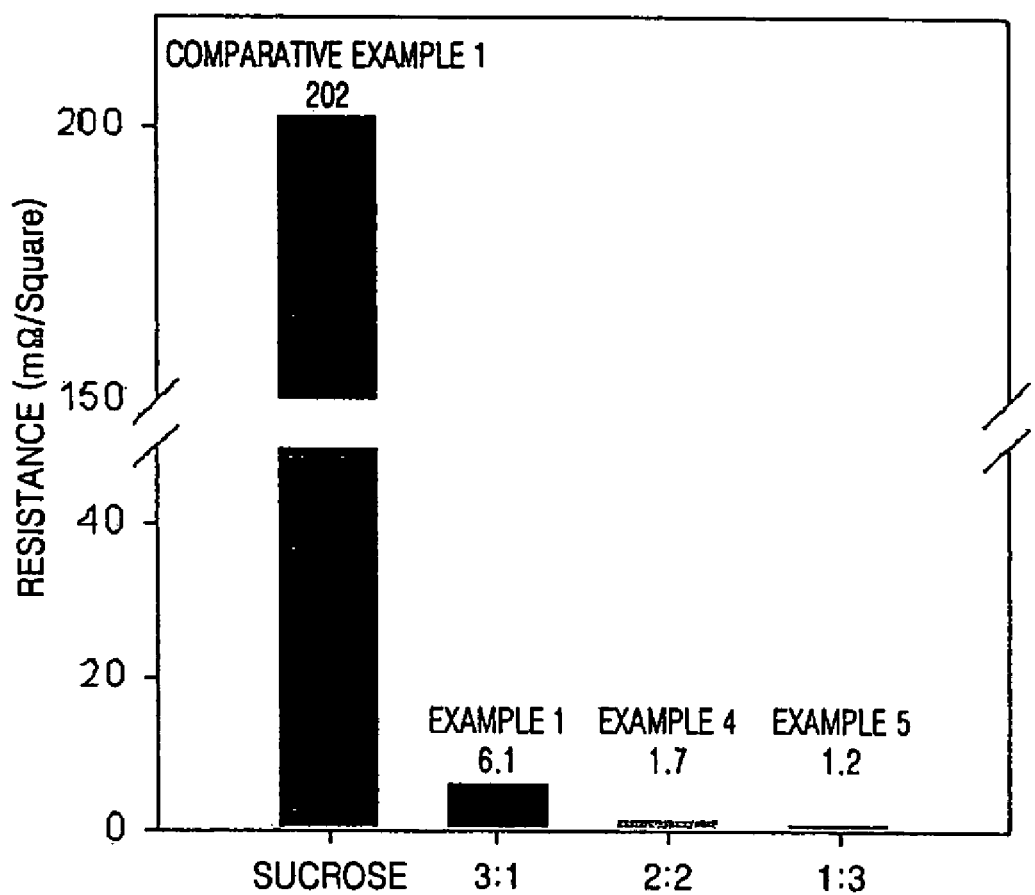
FIG. 7 is a graph illustrating the results of measuring the sheet resistance of mesoporous carbon prepared in Examples 1, 4 and 5 and Comparative Example 1.
Figure 5:
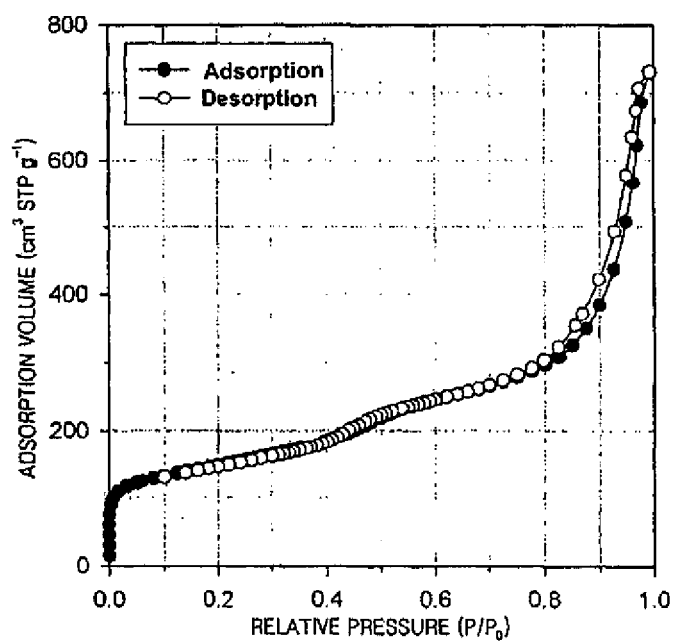
Figure 6:
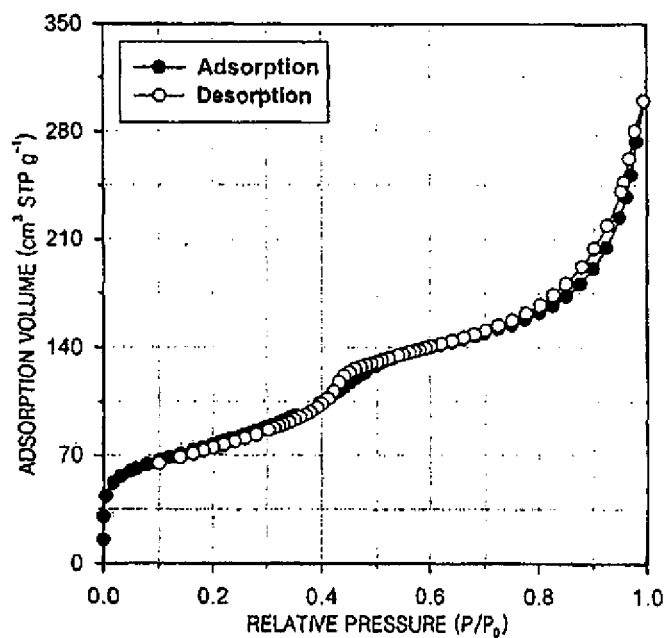

FIG. 7 illustrates the results of measuring the sheet resistance of the mesoporous carbon prepared in Examples 1, 4 and 5 and Comparative Example 1. The sheet resistance was measured by the method described above.

Referring to FIG. 7, the mesoporous carbon of Examples 1, 4 and 5 had a much lower sheet resistance than the mesoporous carbon of Comparative Example 1.

The surface area, the pore volume and the pore diameter of the mesoporous carbon of Examples 1, 3 and 4 are shown in Table 1.

TABLE 1

|  | BET Surface area (m$^2$/g) | Pore volume (cm$^3$/g) | Pore diameter (nm) |
|---|---|---|---|
| Example 1 | 571 | 1.02 | 3.5 |
| Example 3 | 280 | 0.39 | 3.6 |
| Example 4 | 172 | 0.23 | 3.6 |

EXAMPLE 5

Manufacture of Supported Catalyst and Fuel Cell 0.5 g of the mesoporous carbon prepared in Example 1 was placed in a vinyl bag. 0.9616 g of H$_2$PtCl$_6$ was dissolved in 1.5 ml of acetone, and the solution was added to the vinyl bag containing the mesoporous carbon.

The mixed solution was dried in air for four hours, transferred to a crucible, and then dried in a drying device at 60° C. overnight. Then, the crucible was placed in an electric furnace through which nitrogen was passed through for 10 minutes. Then, hydrogen was passed through while the temperature was increased from room temperature to 200° C. and then maintained at 200° C. for 2 hours to reduce the Pt salt impregnated in the mesoporous carbon. Then, the gas flowing in the electric furnace was replaced with nitrogen. The temperature was increased by 5° C./min to 250° C., maintained at 250° C. for 5 hours, and then slowly reduced to room temperature. Then, the result was impregnated with 0.9616 g of H$_2$PtCl$_6$ dissolved in 1.5 mL of acetone, and the reduction process was repeated. As a result, a supported catalyst in which the concentration of impregnated Pt was 60% by weight was obtained.

The supported catalyst was dispersed in a solution prepared by dispersing NAFION 115 (produced from Du Pont Inc.) in isopropylalcohol to form a slurry. The slurry was coated on a carbon electrode through a spraying process, and the concentration of the coated catalyst was 3 mg/cm$^2$ based on the amount of Pt. Then, the electrode was passed through a rolling machine to increase the adhesive force between a catalyst layer and a carbon paper, thus forming a cathode.

An anode electrode was produced using a commonly available PtRu black catalyst. Then, a unit cell was produced using the cathode and the anode.

COMPARATIVE EXAMPLE 3

Manufacture of Supported Catalyst and Fuel Cell

A supported catalyst and a unit cell was produced in the same manner as in Example 5, except using a supported catalyst prepared by impregnating Pt into the mesoporous carbon of Comparative Example 1 instead of the mesoporous carbon of Example 1.

Performances of the unit cells prepared in Example 5 and Comparative Example 3 were measured at 50° C. while 2M methanol and an excessive amount of air were supplied.

The fuel cell prepared in Example 5 exhibited higher efficiency than the fuel cell prepared in Comparative Example 3.

The mesoporous carbon according to an aspect of the present invention uses a mesophase pitch and a carbon precursor to reduce sheet resistance, and thus can efficiently transfer electric energy. Such mesoporous carbon can be used as a conductive material in electrodes for fuel cells. When the mesoporous carbon is used as a support for catalysts of electrodes, a supported catalyst containing the support can be used to manufacture a fuel cell having high efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of preparing mesoporous carbon, the method comprising:
    impregnating an ordered mesoporous silica (OMS) with a carbon precursor mixture comprising a mesophase pitch, a carbon precursor other than mesophase pitch, an acid, and a solvent, wherein the weight ratio of the mesophase pitch to the carbon precursor in the carbon precursor mixture is 1:4 to 1:1;

heat-treating and carbonizing the impregnated OMS to form an OMS-carbon composite; and removing the OMS from the OMS-carbon composite.

2. The method of claim 1, wherein the carbon precursor is composed of at least one material selected from the group consisting of a carbohydrate, furfuryl alcohol, divinylbenzene, phenol-formaldehyde, resorcinol-formaldehyde, phenanthrene, and anthracene.

3. The method of claim 1, wherein the total amount of the mesophase pitch and the carbon precursor is 50 to 120 parts by weight based on 100 parts by weight of the OMS.

4. The method of claim 1, wherein the acid is composed of at least one acid selected from the group consisting of sulfuric acid, nitric acid, phosphoric acid, and para-toluene sulfonic acid.

5. The method of claim 1, wherein the solvent comprises at least one solvent selected from the group consisting of water, acetone, methanol, ethanol, isopropylalcohol, n-propylalcohol, butanol, dimethylacetamide, dimethylformamide, dimethylsulfoxide, N-methyl-2-pyrrolidone, tetrahydrofurane, tetrabutylacetate, n-butylacetate, m-cresole, toluene, ethyleneglycol, y-butyrolactone and hexafluoroisopropanol (HFIP).

6. The method of claim 1, wherein the OMS is MCM-48, SBA-1, SBA-15, KIT-1 or MSU-1.

7. The method of claim 1, wherein the OMS has an x-ray diffraction peak of 2° or less.

8. The method of claim 1, wherein the amount of the acid is 30 to 300 parts by weight based on 100 parts by weight of the OMS, and the amount of the solvent is 400 to 900 parts by weight based on 100 parts by weight of the OMS.

9. The method of claim 1, wherein a weight ratio of the total amount of the mesophase pitch and the carbon precursor to the amount of acid is 1:3.5 to 1:0.3.

10. The method of claim 1, wherein the impregnating of the OMS with the carbon precursor mixture is carried out by impregnating the OMS with a first portion of the carbon precursor mixture, heat-treating the OMS impregnated with the first portion of the carbon precursor mixture, and carrying out at least one additional cycle wherein the OMS is impregnated with at least one additional portion of the carbon precursor and then heat treated.

11. The method of claim 1, wherein the carbon precursor mixture contains an effective amount of mesophase pitch to provide a reduced sheet resistance in the mesoporous carbon, in comparison to a mesoporous carbon produced by a method in which the carbon precursor mixture does not contain mesophase pitch.

12. The method of claim 1, wherein the OMS is removed from the OMS-carbon composite by dissolving the mesoporous silica with an aqueous HF solution or an aqueous NaOH solution.

13. A mesoporous carbon prepared by the method of claim 1.

14. The mesoporous carbon of claim 10, wherein an x-ray diffraction analysis of the mesoporous carbon shows one or more main peaks of Bragg's 2 theta (2θ) angle to the CuK-αX-ray wavelength of 1.541 Å appear at 0.5 to 2°, at 23 to 26°, or at 0.5 to 2 and at 23 to 26°.

15. The mesoporous carbon of claim 13, wherein the average diameter of mesopores is 2 to 10 nm, the mesoporous carbon has a specific surface area of 200 to 2000 $m^2/g$, and the mesoporous carbon has a sheet resistance of 1 to 50 $m\Omega/cm^2$ at a pressure of 75.4 $kgf/cm^2$.

16. The mesoporous carbon of claim 15, wherein the mesoporous carbon further contains micropores.

17. A supported catalyst comprising:
the mesoporous carbon prepared by the method of claim 1; and
metal catalyst particles that are supported on the mesoporous carbon.

18. The supported catalyst of claim 17, wherein the amount of the metal catalyst particles is 40 to 80 parts by weight based on 100 parts by weight of the supported catalyst.

19. The supported catalyst of claim 17, wherein an x-ray diffraction analysis of the mesoporous carbon shows one or more main peaks of Bragg's 2 theta (2θ) angle to the CuK-α X-ray wavelength of 1.541 Å appear at 0.5 to 2°, at 23 to 26°, or at 0.5 to 2 and at 23 to 26°.

20. The supported catalyst of claim 19, wherein the average diameter of mesopores of the mesoporous carbon is 2 to 10 nm, and the mesoporous carbon has a specific surface area of 200 to 2000 $m^2/g$, and the mesoporous carbon has a sheet resistance of 1 to 50 $m\Omega/cm^2$ at a pressure of 75.4 $kgf/cm^2$.

21. A fuel cell comprising:
a cathode;
an anode; and
an electrolyte membrane interposed between the cathode and the anode, wherein at least one of the cathode and the anode contains the supported catalyst of claim 17.

22. The fuel cell of claim 21, wherein the amount of the metal catalyst particles is 40 to 80 parts by weight based on 100 parts by weight of the supported catalyst.

23. The fuel cell of claim 21, wherein an x-ray diffraction analysis of the mesoporous carbon shows one or more main peaks of Bragg's 2 theta (2θ) angle to the CuK-αX-ray wavelength of 1.541Å appear at 0.5 to 2°, at 23 to 26°, or at 0.5 to 2 and at 23 to 26°.

24. The fuel cell of claim 21, wherein the average diameter of mesopores of the mesoporous carbon forming the supported catalyst is 2 to 10 nm, and the mesoporous carbon has a specific surface area of 200 to 2000 $m^2/g$, and the mesoporous carbon has a sheet resistance of 1 to 50 $m\Omega/cm^2$ at a pressure of 75.4 $kgf/cm^2$.

* * * * *

UNITED STATES PATENT AND TRADEMARK OFFICE
CERTIFICATE OF CORRECTION

| | | |
|---|---|---|
| PATENT NO. | : 7,776,779 B2 | Page 1 of 4 |
| APPLICATION NO. | : 11/445235 | |
| DATED | : August 17, 2010 | |
| INVENTOR(S) | : Sang Hoon Joo et al. | |

It is certified that error appears in the above-identified patent and that said Letters Patent is hereby corrected as shown below:

In the Drawings

FIG. 5, Sheet 6 of 8       Delete Drawing Sheet 6 and substitute therefore the Drawing Sheet, consisting of Fig. 5, as shown on the attached page FIG. 6, Sheet 7 of 8       Delete Drawing Sheet 7 and substitute therefore the Drawing Sheet, consisting of Fig. 6, as shown on the attached page.

In the Claims

Column 11, Claim 8, line 30       Delete "400to 900parts"
Insert -- 400 to 900 parts --

Column 12, Claim 14, lines 5 and 6       Delete "CuK-αX-ray"
Insert -- CuK-α X-ray --

Column 12, Claim 14, line 7       Delete "or at 0.5 to 2"
Insert -- or at 0.5 to 2° --

Column 12, Claim 15, line 10       Delete "200to 2000m$^2$/g,"
Insert -- 200 to 2000 m$^2$/g, --

Column 12, Claim 19, line 27       Delete "or at 0.5 to 2"
Insert -- or at 0.5 to 2° --

Signed and Sealed this
Twenty-ninth Day of November, 2011

David J. Kappos
*Director of the United States Patent and Trademark Office*

CERTIFICATE OF CORRECTION (continued)
U.S. Pat. No. 7,776,779 B2

| | |
|---|---|
| Column 12, Claim 20, line 32 | Delete "1 to 50mΩ/cm$^2$" <br> Insert -- 1 to 50 mΩ/cm$^2$ -- |
| Column 12, Claim 23, line 44 | Delete "CuK-αX-ray" <br> Insert -- CuK-α X-ray -- |
| Column 12, Claim 23, line 45-46 | Delete "or at 0.5 to 2" <br> Insert -- or at 0.5 to 2° -- |